United States Patent [19]

Morper et al.

[11] Patent Number: 5,075,007
[45] Date of Patent: Dec. 24, 1991

[54] BIOLOGICAL WASTEWATER PURIFICATION WITH A DOWNSTREAM PRECIPITATION STAGE

[75] Inventors: Manfred Morper, Starnberg; Wolfgang Reiser, Munich, both of Fed. Rep. of Germany

[73] Assignee: Linde Aktiengesellschaft, Wiesbaden, Fed. Rep. of Germany

[21] Appl. No.: 528,508

[22] Filed: May 25, 1990

[30] Foreign Application Priority Data

May 29, 1989 [DE] Fed. Rep. of Germany ... 3917415

[51] Int. Cl.$^5$ .............................................. C02F 3/26
[52] U.S. Cl. ..................................... 210/604; 210/614; 210/621; 210/627; 210/631; 210/711; 210/716; 210/906
[58] Field of Search ............... 210/603, 604, 614, 621, 210/673–677, 631, 710, 711, 712, 713, 714, 716–718, 906

[56] References Cited

U.S. PATENT DOCUMENTS

| | | | |
|---|---|---|---|
| 3,440,165 | 4/1969 | Davis et al. | 210/631 |
| 3,440,166 | 4/1969 | Davis et al. | 210/711 |
| 3,623,975 | 11/1971 | Cardinal et al. | 210/711 |
| 3,947,350 | 3/1976 | Cardinal, Jr. | 210/711 |
| 4,076,620 | 2/1978 | Opferkuch, Jr. et al. | 210/711 |
| 4,227,998 | 10/1980 | Reimann | 210/627 |

*Primary Examiner*—Thomas Wyse
*Attorney, Agent, or Firm*—Millen, White & Zelano

[57] ABSTRACT

Wastewater containing impurities refractory to secondary treatment is first introduced into an aerobic biological treatment stage operating with an oxygen-enriched stream and subsequently into a precipitation stage where the biologically treated wastewater is combined with $Ca(OH)_2$ to precipitate $Ca(OH)_2CaCO_3$ sludge which adsorbs or occludes impurities. The clear liquid, separated from the resultant sludge, is passed to a second precipitation stage where it reacts with a $CO_2$ and oxygen-containing waste gas at least in part from the aerobic biological treatment stage, thereby forming additional $CaCO_3$. Waste gas withdrawn from the second precipitation stage, being enriched in oxygen is recycled to the aerobic biological treatment stage.

17 Claims, 1 Drawing Sheet

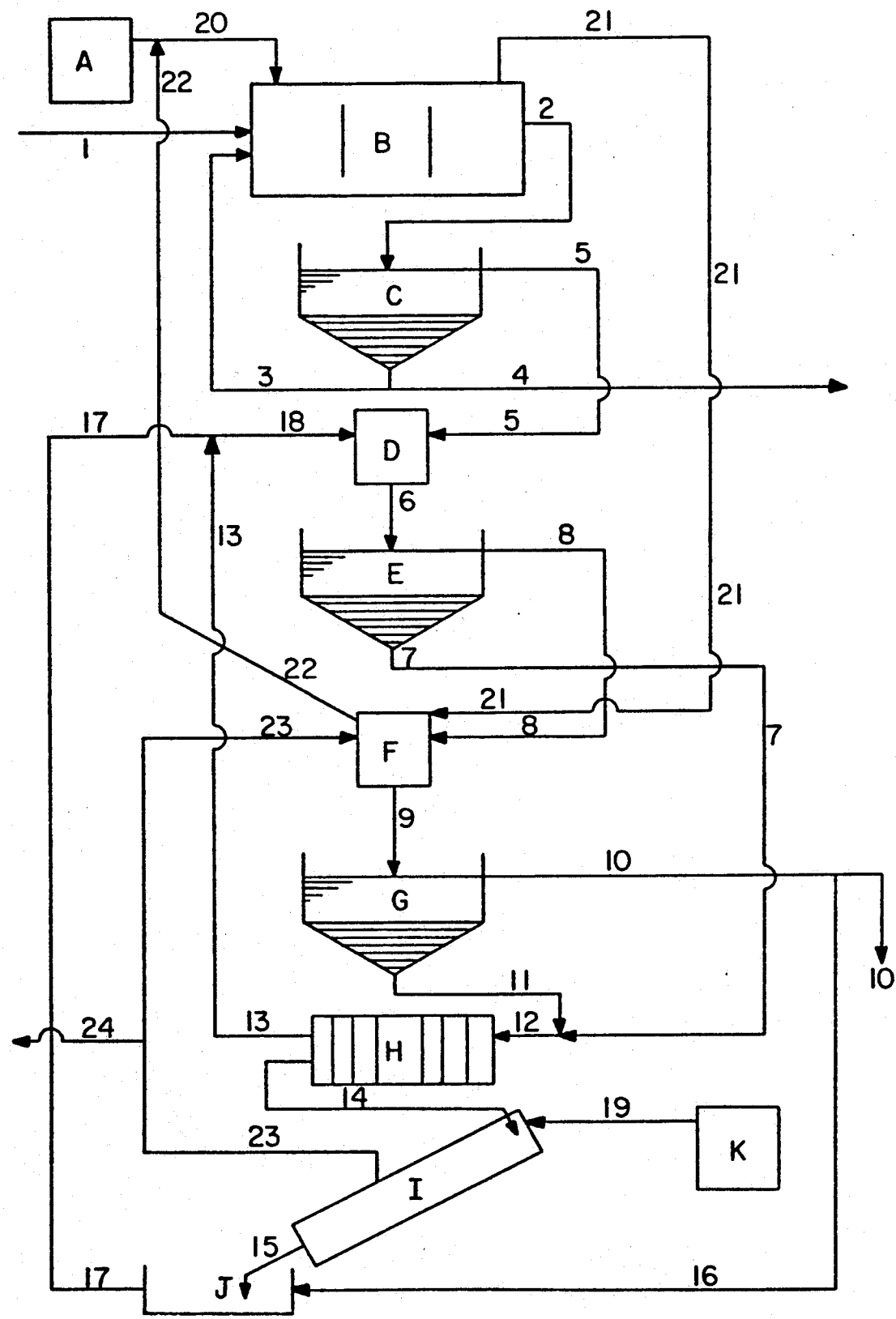

BIOLOGICAL WASTEWATER PURIFICATION WITH A DOWNSTREAM PRECIPITATION STAGE

BACKGROUND OF THE INVENTION

This invention relates to a process for the purification of wastewater wherein the wastewater is first introduced into an aerobic biological treatment stage and subsequently into a precipitation stage.

Organically polluted wastewaters are usually subjected to biological purification. After the biological purification, substances which cannot be biograded, or are biogradable only with difficulties, remain in the wastewater and require removal. This is a particularly important problem in the case of certain industrial effluents, for example cellulose wastewaters. To remove these substances which are refractory to biological purification, a downstream precipitation stage is employed to occlude and/or adsorb the substances, for example by precipitating with Fe salts, Al salts, or bentonite, etc.

Classical methods employing a precipitation stage following a biological stage exhibit the drawback that precipitation chemicals are costly and cannot be recovered, thereby adding a significant cost to the system. Moreover, large amounts of organically loaded inorganic precipitation sludge must be dumped, thereby causing secondary expenses and problems.

SUMMARY OF THE INVENTION

An object of one aspect of the present invention is to provide an improved process of the type discussed above.

Upon further study of the specification and appended claims, further objects and advantages of this invention will become apparent to those skilled in the art.

According to the process aspect of the invention, a process is provided which comprises:

(a) passing the wastewater into an aerobic biological treatment state and aerating the wastewater with a gas containing at least 21 molar percent oxygen, (b) passing resultant biologically treated wastewater in contact with excess $Ca(OH)_2$ to precipitate a $Ca(OH)_2 + CaCO_3$ sludge and to remove further impurities from the wastewater, (c) separating resultant $Ca(OH)_2 + CaCO_3$ from the purified wastewater.

The organically contaminated wastewater is subjected to secondary treatment, i.e. biological purification in a tank aerated with preferably technically pure oxygen, at least about 90 molar percent oxygen, or with a gas enriched in oxygen, e.g., at least about 30 molar percent oxygen. Subsequently, the biologically purified wastewater is combined with $Ca(OH)_2$ preferably in a quantity of about 500–6,000 g/m$^3$.

Some of the added $Ca(OH)_2$ may form insoluble phosphates if phosphates are present in the wastewater. However, it is essential, according to the present invention to add substantially greater amounts of $Ca(OH)_2$ than would be conventionally added to remove phosphates. As phosphate contents of most wastewaters is low (typically below 10 mg/l) the amount of $Ca(OH)_2$ consumed for $Ca_3(PO_4)_2$ precipitation is negligible. If, however, phosphate-concentrations above 100 mg/l are found, an additional amount of $Ca(OH)_2$ is added, to overcome the stoichiometric requirements of $Ca_3(PO_4)_2$-precipitation.

After the $Ca(OH)_2$ is introduced, a sludge is formed comprising undissolved $Ca(OH)_2$ and $CaCO_3$, the latter being produced by reaction of $Ca(OH)_2$ with the $CO_2$ content of the wastewater. An organic pollutant load refractory to secondary treatment is bound to the sludge. The sludge is then separated, for example, by sedimentation.

The strongly alkaline supernatant is preferably mixed with $CO_2$-containing gas which can be the waste gas from the aeration facility, the exhaust gas from a lime kiln (calcining furnace), or from an anaerobic reactor, or from a fossil fuel-fired conventional furnace, or a combination thereof. Thereby the wastewater is neutralized and at the same time additional $CaCO_3$ is precipitated, binding additional organic pollutant load. The $CaCO_3$ sludge is likewise separated, for example by sedimentation, whereas the neutralized wastewater is discharged.

The sludges are dewatered and fed into a calcining furnace where the organic substances, with supplied oxygen, are burned to $CO_2$, and the $CaCO_3$ and $Ca(OH)_2$ are converted into $CaO$ (burnt lime). The latter is slaked with water to form $Ca(OH)_2$ and reused in the precipitation stage.

The invention achieves a combination of a biological first stage with a physicochemical second stage in such a way that the specific effects of both process stages (high degree of elimination of the organic pollution) remain preserved without introducing secondary problems such as high costs of chemicals or sludge dumping.

The invention also makes it possible to purify wastewaters having a high proportion of substances which are difficult to biodegrade and/or which carry colorants, e.g., dyes, at a high degree of efficiency.

Those wastewater streams that are particularly amenable to the present invention analyze as follows:

wastewaters from pulp and papermills (originally no phosphate) where the colored and refractory compounds are predominantly lignins and lignin derivatives made soluble during the pulping process.

chemical and petrochemical wastes, where all kinds of high molecular weight substances such as polymers are found (no phosphates).

coke oven plant wastes, where phenols, polyphenols, tars prevail (no phosphates).

sugar mill wastes where dextrous and other molasses biopolymers are colored and refractory.

food industry wastes with Maillard-Products from thermal processes (generally no phosphates).

Since the precipitation sludge, after conversion in the calcining furnace, can be reused for precipitation, there is no need to dump precipitation sludge. Owing to the recirculation of $Ca(OH)_2$, the need for chemicals is very low. Furthermore, the oxygen utilized in the aeration facility can be utilized to almost 100%. Since $CO_2$ is constantly newly formed by the biodegrading process, and is constantly being recovered by the decomposition of $CaCO_3$, the process is self-sufficient with respect to $CO_2$.

A wastewater having an especially high degree of purity is produced by the biological and physicochemical purification process of this invention so that it is possible to at least partially recycle many treated industrial wastewaters. Thereby, not only is the consumption of fresh water reduced, but it is likewise possible to lower the amounts of wastewater passed into drainage ditches. As an indirect result, the plant operator is subject to lower wastewater fees or fines.

BRIEF DESCRIPTION OF DRAWING

The attached FIGURE is a flow chart of a preferred comprehensive embodiment of the invention, and the following tables of legends describe the various streams and apparatuses set forth:

Streams Identified by Reference Numerals in the FIGURE 1. feed of raw wastewater to the aeration tank B
2. activated sludge/wastewater mixture to the post clarification tank C
3. backflow sludge from the post clarification tank C to the aeration tank B
4. excess biological sludge for discharge (e.g. dewatering and combustion)
5. biologically pre-purified wastewater from post clarification tank C to the alkaline mixing tank D
6. alkaline mixture of wastewater and precipitation sludge, undissolved $Ca(OH)_2$, precipitated $CaCO_3$, and adsorbed organic material (COD)
7. precipitation sludge $Ca(OH)_2$, $CaCO_3$ and organic load from alkaline mixing tank D
8. alkaline clear water from settling tank E
9. neutral clear water and neutral precipitation sludge ($CaCO_3$ and adsorbed organic material)
10. physically purified wastewater for delivery to the drainage ditch or for return into production
11. settled neutral precipitation sludge ($CaCO_3$ and organic material)
12. mixture of precipitation sludges 7 and 11 to dewatering facility H
13. liquid phase of mixed precipitation sludges (centrifugate, filtrate) back into the alkaline mixer D
14. dewatering precipitation sludge to calciner I Ca-$(OH)_2$ and $CaCO_3$ and organic material]
15. burnt lime (CaO for reuse
16. slaking water for producing $Ca(OH)_2$ from CaO, suitably as a component stream of the purified wastewater 10
17. $Ca(OH)_2$ suspension (milk of lime) for recycling into the alkaline mixer D
18. mixture of 17 and liquid phase 13 from dewatering facility for feeding into the alkaline mixer D
19. $CaCO_3$ to replenish Ca losses through drainage 10
20. gaseous oxygen for supplying the aerobic biomass in the aeration tank
21. waste gas of the aeration tank, consisting essentially of oxygen and $CO_2$
22. waste gas from neutral mixer F, consisting essentially of oxygen, for recycling into the aeration tank; $CO_2$ from the aeration tank reacts with $Ca(OH)_2$ to insoluble $CaCO_3$
23. waste gas from the calciner I, essentially $CO_2$ from $CaCO_3$ and from the combustion of organic material
24. excess $CO_2$ for removal

Apparatuses Identified by Reference Letters in the FIGURE

A. oxygen supply (e.g. air fractionator, pipeline, liquid oxygen)
B. oxygen-aerated aeration tank
C. post clarification tank for separating activated sludge and wastewater
D. mixing tank for biologically purified wastewater and $Ca(OH)_2$
E. alkaline settling tank for separating alkaline sludge $Ca(OH)_2$ and $CaCO_3$ and adsorbed organic load
F. mixing tank for alkaline wastewater with $CO_2$-containing gas
G. neutral settling tank for separating $CaCO_3$ and adsorbed organic load
H. dewatering device for precipitation sludges from E and G
I. calcining furnace (revolving tubular furnace) for converting $Ca(OH)_2$ and $CaCO_3$ and organic material into CaO (burnt lime) and $CO_2$
J. lime slaking tank
K. $CaCO_3$ reservoir for replenishing lime losses

Detailed Description of the Process of the FIGURE

An organically loaded, approximately neutral wastewater 1 is conducted into the oxygen-aerated aeration tank B where the biodegradable proportion of the organic load is partially converted into biological excess sludge 4 and partially into $CO_2$, the latter leaving the aeration tank B together with unconsumed oxygen as waste gas 21. The activated sludge/wastewater mixture 2 flows into a post clarification tank C where it is separated into a sludge stream 3 and 4 and into a clear water stream 5.

The biologically purified wastewater 5 is conducted into an alkaline mixer D where it is mixed with $Ca(OH)_2$ from a lime slaking tank J. The biologically purified wastewater 5 has an increased $CO_2/HCO_3$ content, owing to the high $CO_2$ partial pressure in the gas phase of the oxygen-aerated aeration tank B, leading to the precipitation of $CaCO_3$ by reaction with excess $Ca(OH)_2$. The organic material still contained in the wastewater after the biological purification is extensively bound to the precipitation sludge due to adsorption on undissolved $Ca(OH)_2$ and precipitated $CaCO_3$ and due to the formation of insoluble Ca salts.

In an alkaline settling tank E, the precipitation sludge 7 is separated from the alkaline clear water 8. The alkaline clear water is conducted into a neutral mixing tank F and mixed therein with $CO_2$-containing gas consisting essentially of the waste gas 21 from the aeration tank B and partially of the waste gas 23 from the calciner I. $CaCO_3$ is produced by reaction of $Ca(OH)_2$ with $CO_2$; this $CaCO_3$ is precipitated in insoluble form and adsorbs further organic material. During this step, the wastewater is neutralized, a basic requirement for being discharged to a drainage ditch and/or for recycling, for example, into an industrial facility. Since $CO_2$ is extensively reacted to $CaCO_3$ in the central mixer F, an oxygen-rich waste gas 22, i.e., above the concentration of $O_2$ in air (21 mol. %), preferably 50 to 99, especially 70 to 95 molar percent $O_2$, is obtained therein which is returned into the aeration tank, resulting in a practically complete utilization of oxygen, e.g., above 95%, preferably above 98% oxygen.

In a neutral settling tank G, the precipitated $CaCO_3$ with the adsorbed organic material is separated from the neutral clear water 10. The sludges from settling tanks E and G are combined and fed to a dewatering facility H, for example a centrifuge or a filter press. The liquid phase 13 is returned into the alkaline mixer where microscopic $CaCO_3$ particles act as crystallizing nuclei. The dewatered sludge is heated in a calciner I where it is converted into burnt lime; during this step, the organic material is simultaneously burned in the presence of oxygen. The $CO_2$-containing waste gas 23 from the calciner I is introduced into the neutral mixer F, insofar as necessary for covering the residual $CO_2$ requirement.

Calcium values discharged with the purified wastewater 10 are replenished from a reservoir K, suitably in the form of inexpensive $CaCO_3$ (limestone) which is fed, together with the precipitation sludge 12, to the calciner I. Since $CO_2$ is constantly formed in the aeration tank B, dissolved in the biologically purified wastewater 5 as well as concentrated in the waste gas stream 21, and since $CO_2$ is likewise recovered from the calcining device, the entire process cycle is self-sufficient with respect to $CO_2$. Excess $CO_2$ is suitably transferred out of the calciner waste gas 23.

The disclosures of all applications, patents and publications, if any, cited above and below, and of corresponding German application P3917415.8, filed May 29, 1989, are hereby incorporated by reference.

Without further elaboration, it is believed that one skilled in the art can, using the preceding description, utilize the present invention to is fullest extent. The following preferred specific embodiments are, therefore, to be construed as merely illustrative, and not limitative of the remainder of the disclosure in any way whatsoever.

EXAMPLE

Highly colored wastewater from a pulp mill was subjected to an oxygen aerated activated sludge treatment. Average influent COD was around 540 mg/l. Biological oxidation only removed some 50%, so that the effluent from the secondary clarifier still contained some 270 mg/l of COD and was still highly colored (dark brown like black coffee). This effluent was mixed with increasing amounts of $Ca(OH)_2$. Although small amounts of $Ca(OH)_2$ as low as 0.3 g/l already showed an effect of COD and color removal, optimized results were obtained with 5 g/l of $Ca(OH)_2$. Higher $Ca(OH)_2$ additions resulted in only marginal improvements. Thus by adding 5 g/l of $Ca(OH)_2$, COD dropped from 270 to 167 mg/l (38% removal), while colour (measured as an extinction of 435 nm) was removed by 88%. A brown precipitate was obtained, which when dewatered and dried, yielded a dark brown powdered product. The alkaline supernatant (pH 12.2) was tested with $CO_2$-containing gas until a pH of 7.5 was reached. This led to the precipitation of a whitish precipitate. A further COD removal of 10 mg/l and a further extinction decrease of 3% were observed. After incineration at 950° C., the combined precipitates yielded a white powdered product, which proved to be very pure CaO, which after storing could be reused as a precipitant, showing the same efficiency for COD- and color-removal as fresh $Ca(OH)_2$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without department from the spirit and scope thereof, can make various changes and modifications of the invention to adapt it to various usages and conditions.

What is claimed is:

1. A process for the purification of wastewater comprising:
   (a) passing the wastewater into an aerobic biological treatment stage and aerating the wastewater with a gas containing at least 21 molar percent oxygen, to form activated sludge and biologically purified wastewater,
   (b) separating said activated sludge from said biologically purified wastewater,
   (c) combining resultant separated biologically purified wastewater with $Ca(OH)_2$ in a precipitation stage to precipitate a $Ca(OH)_2/CaCO_3$ sludge and to remove non-biodegraded impurities from the wastewater, said $Ca(OH)_2$ being combined in substantial excess of stoichiometric quantities for forming $Ca_3(PO_4)_2$, and
   (d) separating resultant $Ca(OH)_2/CaCO_3$ from the purified wastewater.

2. A process according to claim 1 wherein a gas containing at least 90 molar percent oxygen is employed to aerate the wastewater in the biological treatment sludge.

3. A process according to claim 2, further comprising downstream of the precipitation stage, mixing the purified wastewater with a $CO_2$-containing gas to produce additional $CaCO_3$ sludge to adsorb additional impurities, and separating further purified wastewater from said additional $CaCO_3$ sludge.

4. A process according to claim 1, further comprising downstream of the precipitation stage, mixing the purified wastewater with a $CO_2$-containing gas to produce additional $CaCO_3$ sludge to remove additional impurities, and separating further-purified wastewater from said additional $CaCO_3$ sludge.

5. A process according to claim 4, wherein the $CO_2$-containing gas comprises gas from the aerobic biological treatment stage.

6. A process according to claim 5, further comprising withdrawing from the stage producing additional $CaCO_3$ sludge, a waste gas containing an oxygen concentration higher than air and recycling said waste gas to the aerobic biological treatment stage.

7. A process according to claim 6 wherein said waste gas contains at 70 molar percent oxygen.

8. A process according to claim 4, further comprising withdrawing from the stage producing additional $CaCO_3$ sludge, a waste gas containing an oxygen concentration higher than air and recycling said waste gas to the aerobic biological treatment stage.

9. A process according to claim 8, wherein said waste gas contains at least 70 molar percent oxygen.

10. A process according to claim 9, wherein a gas containing at least 90 molar percent oxygen is employed to aerate the wastewater in the biological treatment stage.

11. A process according to claim 10, wherein the non-biodegraded composition comprises mostly organic matter.

12. A process according to claim 1, further comprising dewatering said sludge and calcining resultant dewatered sludge in a calcining furnace where the sludge is partially converted into CaO; slaking the CaO with water to form $Ca(OH)_2$; and reintroducing resultant $Ca(OH)_2$ into the precipitation stage.

13. A process according to claim 1, wherein said substantial excess is 500–6,000 $g/m^3$ of $Ca(OH)_2$.

14. A process according to claim 13, wherein said wastewater contains above 100 mg/l of phosphate.

15. A process according to claim 1, wherein said wastewater contains no phosphates.

16. A process according to claim 1, wherein said wastewater contains less than 10 mg/l of phosphate.

17. A process according to claim 1, wherein the non-biodegraded composition comprises mostly organic matter.

* * * * *